United States Patent Office 3,769,341
Patented Oct. 30, 1973

3,769,341
2-(1-NAPHTHYL CARBAMOYL-1,1,1-TRIALKYLHY-DRAZINIUM SALTS AND HERBICIDAL USE THEREOF
Gerhard H. Alt, Creve Coeur, Mo., assignor to Monsanto Company, St. Louis, Mo.
No Drawing. Filed Dec. 30, 1971, Ser. No. 214,383
Int. Cl. C07c 133/08
U.S. Cl. 260—554          3 Claims

ABSTRACT OF THE DISCLOSURE

The 2-(1 - naphthylcarbamoyl) - 1,1,1 - trialkylhydrazinium inner salts have been found to be active pre-emergent herbicides. These compounds are especially active against Canadian thistle and field bindweed.

---

This invention relates to 2-(1-naphthylcarbamoyl)-1,1,1-trialkylhydrazinium inner salts and to their use as pre-emergent herbicides.

In accordance with this invention, it has been discovered that the novel hydrazinium salts of the formula

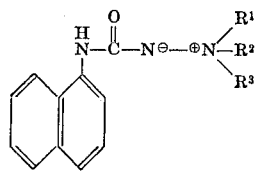

wherein $R^1$, $R^2$ and $R^3$ are each lower alkyl groups containing from 1 to 6 carbon atoms of herbicidal activity.

A preferred embodiment of this invention are those compounds of the above formula in which $R^1$, $R^2$ and $R^3$ are alkyl groups having a maximum of 3 carbon atoms.

Illustrative of the alkyl groups represented by $R^1$, $R^2$ and $R^3$ are, for example, methyl, ethyl, propyl, isopropyl, butyl, secondary butyl, tertiary butyl, pentyl, hexyl and their isomers.

In general, the compounds of this invention are produced by the reaction of a 2 - (1 - naphthylcarbamoyl)-1,1,1-trialkylhydrazinium halide dissolved or suspended in a solvent with a base such as sodium hydroxide dissolved in water in an appropriate reaction vessel. The solvent layer is separated, dried and then the solvent removed by vacuum evaporation. The compounds of this invention can be recrystallized from an ethylacetate-petroleum ether mixture to give a pure produuct.

The temperature at which the reaction is conducted is not narrowly critical and can range from as low as 0° to 30° C. or even higher, depending upon the solvent employed.

It is preferred to employ approximately an excess of the base for ease of reaction and recovery of the product. Other ratios of reactants can be employed, however, no commensurate advantages are obtained thereby.

Among the organic solvents which can be employed in producing the compounds of this invention are the solvents such as benzene, chloroform, water and the like.

The starting 2-(1-naphthylcarbamoyl) - 1,1,1 - trialkylhydrazinium halides are prepared by the following procedure.

A 1,1-dialkyl hydrazine is reacted with a naphthylcarbamoyl halide in a benzene solution. In general, the acid chloride is added slowly, with stirring, and cooling by means of an ice bath to a solution of the hydrazine in an organic solvent which is non-reactive towards either the hydrazine and the carbamoyl halide. The reaction mixture is then allowed to warm to room temperature with continuous stirring and water added to precipitate the solid product. The solid product can be recrystallized in an organic solvent medium such as ethyl acetate-petroleum ether mixtures to yield as a pure product, the 2-(1-naphthylcarbamoyl)-1,1-dialkylhydrazine.

The 2-(1-naphthylcarbamoyl) - 1,1 - dialkylhydrazine (0.03 mol) is dissolved in ethanol and then reacted with an alkyl halide such as methyl iodide (0.06 mol) at reflux for from 4 to 6 hours. The 2-(1-naphthylcarbamoyl) trialkylhydrazinium halide generally crystallized on cooling.

The following examples serve to further illustrate the invention. All parts are by weight unless otherwise specifically set forth.

EXAMPLE 1

2-(1-naphthylcarbamoyl)-1,1,1 - trimethylhydrazinium iodide 0.02 mol was dissolved or suspended in chloroform (50 ml.) in a separating funnel. A 10% solution of sodium hydroxide in water (40 ml.) was added and the funnel shaken vigorously. The chloroform layer was separated and the aqueous layer extracted with three further 50 ml. portions of chloroform. The combined chloroform extracts were dried over magnesium sulfate, decanted and then evaporated under vacuum. The residue was recrystallized from ethyl acetate-petroleum ether to yield the 2-(1-naphthylcarbamoyl)-1,1,1-trimethylhydrazinium inner salt having a melting point of 178 to 179° C. and gave the following analysis:

Calc'd (percent): C, 69.11; H, 7.04; N, 17.27. Found (percent): C, 69.14; H, 7.11; N, 17,24.

The compounds of the present invention possess herbicidal activity. This herbicidal activity is illustrated by the following examples.

EXAMPLE 2

This example illustrates pre-emergent activity of the compounds of this invention.

A good grade of top soil is placed in aluminum pans and compacted to a depth of ⅜ to ½ inch from the top of each pan. A pre-determined number of seeds and vegetative propagules of each of several plant species are placed on top of the solid in the pans. The seeds and propagules are covered with a measured amount of soil containing the chemical admixed throughout. The herbicidal composition is applied at a rate of 5 pounds per acre by spraying the soil to be used as a cover layer then thoroughly mixing the soil and herbicidal compound. The pans are placed on the sand of a greenhouse bench and watered as needed. The soil in the pans absorbs moisture through the apertured bottom of the pans. The plants are observed at the end of approximately 14 days and the results recorded.

The pre-emergent herbicidal activity of the compounds of this invention is measured by the average percent control of each of the plant species. The average percent control is converted to a relative numerical scale for the sake of brevity and simplicity in the example. The pre-emergent herbicidal activity index used in the table is defined as follows:

| Average percent control: | Numerical Scale |
|---|---|
| 0–25 | 0 |
| 26–50 | 1 |
| 51–75 | 2 |
| 76–100 | 3 |

The pre-emergent herbicidal activity of some of the compounds of the present invention is recorded in the following table.

TABLE I

| Plant specie: | Compound of Example 2 |
|---|---|
| Canada thistle | 3 |
| Nutsedge | 0 |
| Quackgrass | 0 |
| Johnson grass | 0 |
| Cocklebur | 0 |
| Velvet leaf | 0 |
| Morning Glory | 2 |
| Lambsquarter | 0 |
| Smartweed | 0 |
| Downy Brome | 0 |
| Barnyard grass | 0 |

In a second test the compound of Example 2 was found to control Canada thistle and field bindweed at a rate of 1 pound active ingredient per acre.

For the sake of brevity and simplicity, the term "active ingredient" is used in this specification to describe the 2-(1-naphthylcarbamoyl) - 1,1,1-trialkylhydrazinium inner salts of this invention.

The term "herbicide" as used herein and in the appended claims means materials which control the growth of plants either (1) all plants in a given locus or (2) selective control the growth of one or more plant species in the presence of other plants. In like manner, "herbicidal" is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "herbicidal formulation or composition" as used herein means a naphthyl or naphthyloxy acetyl hydrazine of this invention in combination with an adjuvant to be defined hereinbelow.

Tht active ingredients hereindefined are suitable for both pre-emergent and post-emergent plant application. That is, they are effective in controlling the growth of germinant seeds, emerging seedings and established vegetation by exposing the seeds, emerging seedlings, or the roots or above-ground portions to the action of an effective amount of one or more of these herbicidally active compounds; however, the best results are usually obtained in a pre-emergent application. Such constitutes a preferred embodiment of the method for controlling plants.

In foliar treatment for the modification of vegetative growth, the active ingredients are applied in amounts from about 0.1 to about 50 or more pounds per acre, preferably about 0.1 to 15 pounds per acre in foliar treatments. In soil applications, it is desirable that the active ingredients be distributed to a depth of at least 0.2 inches. In pre-emergence herbicidal applications the active ingredients are usually applied in amounts from about 0.1 to 25 pounds per acre but preferably from about 0.1 to 10 pounds per acre. It is believed that one skilled in the art can readily determine from the teachings of this specification, including examples, the procedure for any particularly desired application.

In practicing the herbicidal methods of this invention, the active ingredients can be used alone or in combination with a material referred to in the art as an adjuvant in liquid or solid form. The usual purpose of adjuvants are to facilitate application of the herbicidal composition and at the desired dosage rate. Herbicidal formulations are prepared by admixing the active ingredient with one or more adjuvants which includes diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid or organic origin, water, a wetting agent, dispersing agent, an emulsifying agent or any suitable combination of these.

Suitable adjuvants of the foregoing types are not here defined in detail as to composition, particle size, relative amounts, etc., since they are well known in the art.

In general, the active ingredients may be formulated with the active ingredient in minor or major proportions in accordance with the table below:

| Type of formulation: | Concentration of active ingredient, percent |
|---|---|
| (1) Granules of relatively large particle size | 5 to 50 |
| (2) Powdery dusts | 2 to 90 |
| (3) Wettable powders | 2 to 90 |
| (4) Emulsifiable concentrates | 5 to 95 |
| (5) Solutions | .01 to 95 |
| (6) One of the less common types of formulations depending on the desired mode of application | .01 to 95 |

In addition to adjuvants the compounds of this invention can be used in combination with fertilizers and/or other pesticides such as insecticides, fungicides, nematocides, and/or other phytotoxicants, and the like.

Having now described the invention, many ramifications and modified embodiments will readily occur to those skilled in the art. Insofar as such variations do not depart from the spirit and scope of the invention described in this application, they are intended to be embraced by the appended claims in their broadest construction.

What is claimed is:
1. A compound of the formula

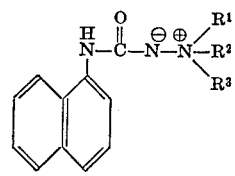

wherein $R^1$, $R^2$ and $R^3$ are each independently an alkyl group of from 1 to 6 carbon atoms.

2. A compound of claim 1 wherein $R^1$, $R^2$ and $R^3$ are alkyl groups of from 1 to 3 carbon atoms.

3. A compound of claim 2 which is 2-(1-naphthylcarbamoyl)-1,1,1-trimethylhydrazinium inner salt.

References Cited

Brown, Journal of Chemical and Engineering Data, vol. 12, No. 4, pp. 612–615 (1967).

Appel et al.: Ber., Jahrg. 99, pp. 3118–3127 (1966).

LEON ZITVER, Primary Examiner

M. W. GLYNN, Assistant Examiner

U.S. Cl. X.R.

71—120